May 1, 1962 G. T. MOORE 3,032,662

COMPENSATION FOR ACTIVITY CHANGES IN SEMICONDUCTOR DEVICES

Filed Feb. 2, 1960

5 Sheets-Sheet 1

INVENTOR.
GERALD T. MOORE

BY

Wolfe, Hubbard, Voit & Osann

ATTORNEYS

May 1, 1962 G. T. MOORE 3,032,662

COMPENSATION FOR ACTIVITY CHANGES IN SEMICONDUCTOR DEVICES

Filed Feb. 2, 1960

5 Sheets-Sheet 2

INVENTOR.
GERALD T. MOORE
BY
Wolfe, Hubbard, Voit & Osann
ATTORNEYS

COMPENSATION FOR ACTIVITY CHANGES IN SEMICONDUCTOR DEVICES

Filed Feb. 2, 1960 5 Sheets-Sheet 3

INVENTOR.
GERALD T. MOORE

BY

Wolfe, Hubbard, Voit & Osann
ATTORNEYS

INVENTOR.
GERALD T. MOORE

BY

Wolfe, Hubbard, Voit & Osann
ATTORNEYS

May 1, 1962 G. T. MOORE 3,032,662

COMPENSATION FOR ACTIVITY CHANGES IN SEMICONDUCTOR DEVICES

Filed Feb. 2, 1960 5 Sheets-Sheet 5

INVENTOR.
GERALD T. MOORE

BY

Wolfe, Hubbard, Voit & Osann

ATTORNEYS

United States Patent Office 3,032,662

Patented May 1, 1962

3,032,662

COMPENSATION FOR ACTIVITY CHANGES IN SEMICONDUCTOR DEVICES

Gerald T. Moore, Bedford, Mass., assignor to Giddings & Lewis Machine Tool Company, Fond du Lac, Wis., a corporation of Wisconsin Filed Feb. 2, 1960, Ser. No. 6,267

14 Claims. (Cl. 250—209)

This invention relates to circuits including semiconductor junction devices and more particularly to means for compensating for activity changes in semiconductor devices that are used for switching purposes. While the invention may be used in connection with many devices incorporating semiconductor materials with P-N junctions, such as transistors, diodes, and the like, it finds especially advantageous use in connection with semiconductor junction photocells in which the back resistance varies inversely with received light.

Recently, the electronics art has expanded rapidly into the field of semiconductors; however, the expansion has not always been easy because semiconductor junction devices are sensitive in their electrical characteristics to ambient temperature changes, aging, and spurious radioactivity. Therefore, it is usual to provide circuitry having parameters which allow semiconductors to function properly despite these inherent limitations. Nevertheless, there are practical problems which cannot always be overcome merely by the proper selection of circuit parameters, as where semiconductor devices are not sufficiently sensitive to mutually exclusive signals which fall within marginal or overlapping zones. For example, the characteristics of a semiconductor device which must respond to "off" and "on" signals may drift with time and temperature so that the difference in responses to the two signals become less than the circuits controlled by such semiconductor device can detect. When an attempt is made to correct these problems merely by biasing the semiconductor junction device to a different range of its response curve, there is danger that the semiconductor junction device may be damaged by excessive biasing voltages.

Accordingly, it is an object of this invention to provide new and improved apparatus to compensate for activity changes in semiconductor devices. In this connection, it is an object of this invention to provide means for correctively changing the operating potentials applied to semiconductor devices responsive to the rate of current flow therethrough. It is, moreover, an object of this invention to provide a circuit including a semiconductor device in combination with a current responsive switch which is coupled to produce a compensating variation in the operating voltage of such semiconductor device in accordance with the rate of current flow therethrough. Still another object of this invention is to utilize a pair of semiconductor devices having substantially identical characteristics to provide compensating changes as the semiconductor devices age and are subjected to changing environmental conditions.

A further object of this invention is to increase the reliability of semiconductor devices by eliminating marginal conditions which might result in erroneous responses of circuits controlled by such semiconductor devices as the latter vary in their current-voltage characteristics. Still another object of this invention is to compensate for spurious changes in the characteristics of a semiconductor device by automatically shifting the load line for the circuit of such device in accordance with such changes. Yet another object of the invention is to maintain a predetermined difference between two levels of output signals emanating from semiconductor devices despite changes in the characteristics of such devices with temperature or age. A still further object of this invention is to reliably protect semiconductor devices against damage which might otherwise be caused by excessive biasing potentials while at all times maintaining a biasing potential which is adequate to cause a proper output signal despite wide fluctuations in ambient environmental conditions.

Other objects and advantages of this invention will become apparent upon reading the following detailed description and upon making reference to the attached drawings in which:

FIGURE 1*a* shows diagrammatically a perspective view of a photoelectric head for reading a perforated tape;

FIG. 1*b* shows a sectional view of the perforated tape and reading head taken along line 1—1 of FIG. 1*a*, the tape being advanced slightly in the direction of the arrow;

FIG. 2 schematically shows a circuit which is typical of those that have been used heretofore in connection with light sensitive semiconductor devices in reading heads such as that shown in FIGS. 1*a* and 1*b*;

FIGS. 3*a* and 3*b* are graphs which help explain the operation of the circuit of FIG. 2;

FIG. 4 is a circuit diagram showing one embodiment of the invention;

FIGS. 5*a* and 5*b* are graphs which help explain how the subject invention overcomes the problems which are illustrated by the graphs of FIGS. 3*a* and 3*b*;

While the invention is described in connection with preferred embodiments, it will be understood that the invention is not limited to such preferred embodiments, and that the appended claims are intended to cover the various alternative and equivalent constructions which are included within the scope and spirit of the invention.

Figure 1B:
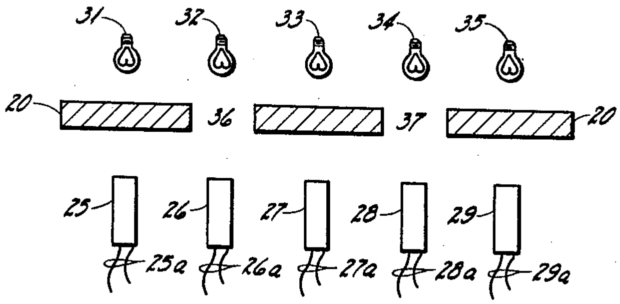
Figure 1A:
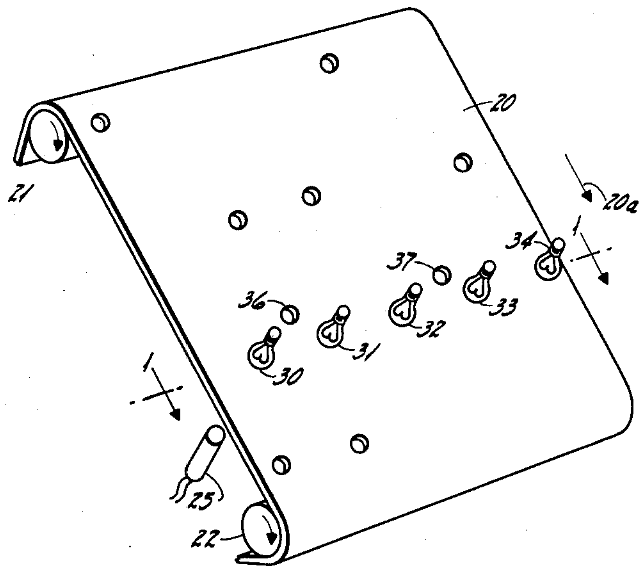

Turning now to FIGURES 1*a* and 1*b*, there is shown a perforated tape 20 of the type that is used in connection with modern, high speed, electronic computers. First, information represented by different combinations of holes is punched into different transverse rows of a paper or plastic tape 20 according to a predetermined code. Thereafter, driven rollers 21, 22 transport tape 20 passed a reading head including a plurality of pickups 25–29, each of which may be a semiconductor P-N junction photosensitive diode. One or more lamps are positioned opposite the pickups on the other side of the perforated tape so that no light reaches any pickup except when one of the perforations is positioned between such pickup and the associated lamp. As different transverse rows of holes in the tape pass by the array of pickups 25–29, different combinations of the latter will receive light or be kept dark depending upon the presence or absence of holes in each row of the tape. As will be more fully explained, the diodes are reversely biased by a source voltage and the current flow therethrough is relatively low or high depending upon whether their back resistance is relatively high or low as determined by the absence or presence of light falling thereon.

As shown in FIG. 1*a*, none of the pickups is receiving light; their back resistances are thus high and relatively little current flows over conductors **25*a*–29*a*. However, perforations 36 and 37** are shown as approaching the pickups. A moment later, as shown in FIG. 1*b*, perforations 36 and 37 have reached a position opposite pickups 26, 28 so that input signals in the form of light from lamps 32, 34 cause greater current to flow over conductors 26*a* and 28*a*. Since, in FIG. 1*b*, no perforations are between lamps 31, 33, 35, and pickups 25, 27, and 29, relatively little current flows over conductors 25*a*, 27*a*, and 29*a*. As is well known, such changes in the back resistance and reverse current of the photosensitive diodes may be sensed by decoding means (not shown) in order to derive input signals for computers or data processing apparatus.

Figure 2:
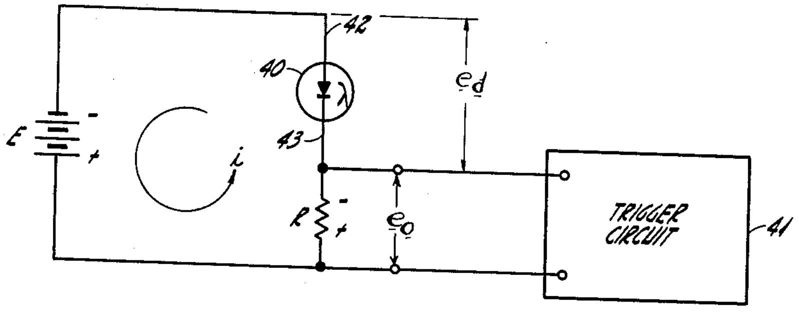
FIGURE 2 PRIOR ART

Turning next to a description of the circuitry that is associated with each of the pickups or diodes 25–29, reference is made to FIG. 2 which shows how circuits have been arranged in the past to utilize such a semiconductor photosensitive diode, the latter being identified by a circle including a diode and the Greek letter "λ." The photocell which is shown at 40 may be a type 1N77A diode; however, it should be understood that reference to this particular type is made by way of example only and that the principles of the invention apply to other types of semiconductor devices.

To provide an output or control signal, a source of potential here shown as a battery E, the photocell or diode 40, and a load resistance R are connected in series with the battery being poled to apply a reverse or back bias to diode 40. Under these conditions, and with no light falling upon diode 40, the current *i* is very small because the P–N junction of diode 40 has an extremely high back resistance; however, when light strikes the diode 40 its back resistance drops abruptly, and current *i* increases to a value which is generally proportional to the intensity of the light. Since diode 40 and load resistance R make-up a voltage divider connected across battery E, the potential of the latter is divided into voltages $e_d$ and $e_o$. Resistance R is, therefore, a load device across which appears an output signal $e_o$ varying as a function of the current flow through the diode 40. This output signal is supplied to a utilization device such as a trigger circuit 41 having its input terminals connected across the resistor R. Trigger circuit 41, which may be of any suitable design, is supposed to turn "on" responsive to the voltage of control signal $e_o$ when diode 40 is conductive (i.e., receives light) and to turn "off" responsive to the voltage of control signal $e_o$ when diode 40 is nonconductive (i.e. dark). However, since diode 40 is sensitive to ambient temperature changes and is subjected to changes which come with aging of its semiconductor material, the signal potential $e_o$ may not always swing between two levels or values sufficiently separated to switch the trigger circuit 41 between the "off" and "on" conditions as the diode is masked from or receives light.

Figure 3A:
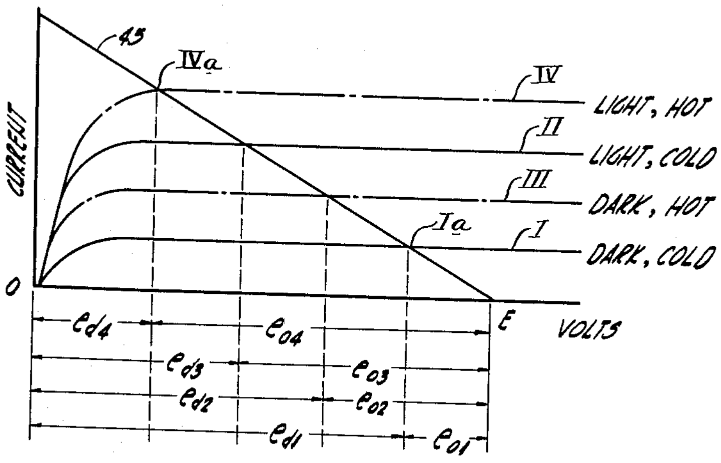
FIGURE 3a PRIOR ART

Turing first to changes caused by variations of ambient temperature, reference is made to FIG. 3*a* which shows a family of curves illustrating on the vertical axis the current which flows under a variety of conditions when the reverse diode voltage $e_d$ has different values measured along the horizontal axis. That is, when diode 40 is dark and at a relatively cold ambient temperature, it possesses a current vs. voltage characteristic represented by the curve I. The current *i* has a relatively small value as the voltage $e_d$ takes on different values. On the other hand, when the diode receives light and is at the same cold temperature, the current *i* is substantially greater for the same values of the diode voltage $e_d$, as represented by the curve II. The back resistance of the diode 40, whether it is dark or deceives light decreases with rising temperature. Thus, at an ambient temperature considerably higher or hotter than that assumed for the curves I and II, the diode 40 exhibits current vs. voltage characteristics as shown by the curve III (dark or masked from light) and the curve IV (receiving light). By way of example, it may be pointed out that when a reading head containing the diode 40 is first put into operation, it may reside at a temperature of around 65° F. and thus operate along curves I and II. As time passes, the head may be heated to as high as 120° F. due to energy dissipated therein and the incident light from the lamps. Thus, the diode 40 will have to operate reliably also along the curves III and IV.

Load line 45 in FIG. 3*a* indicates how the flow of current through diode 40 changes with variations in light and temperature when the load resistance R and the voltage of battery E have typical, particular values. If the value of resistance R is increased or decreased, the slope of line 45 will be decreased or increased. If the potential of battery E is increased or decreased, the point E at which load line 45 intersects the horizontal axis is moved to the right or left. Beneath the horizontal zero axis, there is shown the manner in which the diode voltage $e_d$ and the output signal $e_o$ change with the varying light and temperature conditions. For example, when diode 40 is dark and cold, the intersection I*a* of the curve I and the load line 45 indicates that the voltage drop across diode 40 is $e_{d1}$, thus making the output voltage across resistor R have a value of $e_{o1}$ which is equal to the difference between the supply voltage E and the diode voltage $e_{d1}$. When diode 40 is hot and excited by light, the characteristic curve IV is applicable. The intersection IV*a* therefore indicates that the voltage drop across the diode has the value $e_{d4}$ and the value of the output voltage is $e_{o4}$. In the organization of the circuit of FIG. 2, the value of the voltage E is made less than that which would result in an excessive, destructive reverse voltage across the diode 40. Because P–N junction devices are as a rule damaged or destroyed by excessive back voltages, the value of the supply voltage E is usually limited to the maximum permissible back voltage which the diode 40 can withstand.

Figure 3B:
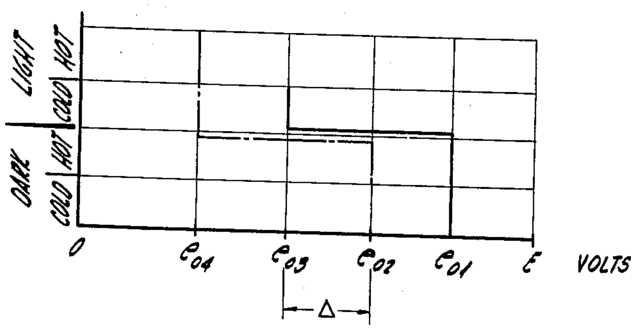
FIGURE 3b PRIOR ART

For a more graphic illustration of the manner in which control signal $e_o$ changes when the diode is masked from or exposed to light, the values which are found from FIG. 3*a* have been plotted as a step curve in FIG. 3*b*. Specifically, when diode 40 is cold, the output signal applied to trigger circuit 41 switches from the value $e_{o1}$ to the value $e_{o3}$, as shown by the solid line curve of FIG. 3*b*, as the diode is made dark or exposed to light. When diode 40 is hot, the output signal $e_o$ applied to trigger circuit 41 switches from the value $e_{o2}$ to the value $e_{o4}$ when the signal light strikes diode 40—as shown by the dot-dash line curve of FIG. 3*b*. Hence, to respond reliably to the output voltage $e_o$ when the diode is operating at any temperature over the range between the "cold" and "hot" temperatures, trigger circuit 41 must be designed to detect the difference between the highest "dark" voltage level $e_{o2}$ and the lowest "light" voltage level $e_{o3}$, as indicated by Δ. It has been found, however, that the voltage difference Δ with most P-N junction diodes is insufficient to provide a high degree of reliability. That is, the voltages $e_{o2}$ and $e_{o3}$ may be separated by such a narrow margin that the utilization device or trigger circuit 41 may not be able to distinguish between them unless it is made unduly complex and expensive.

In accordance with one feature of the invention, the voltage difference Δ is increased by decreasing the slope of load line 45, thereby moving points $e_{o2}$ and $e_{o3}$ further apart. Since the slope of load line 45 is determined by the value of resistor R, and since it is preferable for the load line to have spaced intersections with the curves I–IV, not only is the slope of the load line decreased, but the supply voltage E is increased. However, this would cause the diode voltage $e_d$ to have a very high value, particularly when the diode is operating on the characteristic curve I. Such a high diode voltage $e_d$ would exceed the rated or permissible value and would ordinarily result in breakdown and destruction of the diode junction. To prevent such destruction, means are provided for limiting the voltage $e_d$ which can appear across the photosensitive diode to a value which is substantially smaller than the increased supply voltage. This is accomplished by preventing the voltage appearing across the load resistance R from falling below a selected value, and specifically by creating an auxiliary current flow through that resistance whenever the current through the photosensitive diode falls below a predetermined low value.

Figure 4:
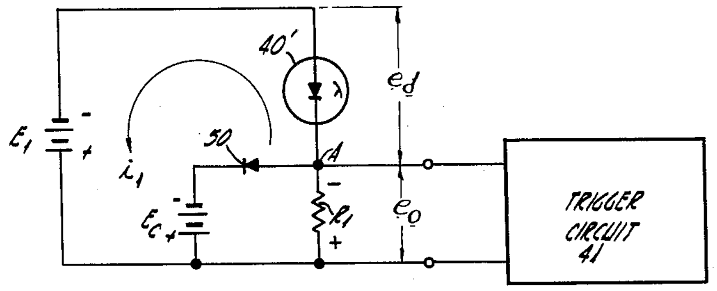

Referring to the exemplary embodiment of the invention shown by FIG. 4, the circuit for the photosensitive diode 40′ differs from the circuit of FIG. 2 in that the supply voltage $E_1$ is considerably greater than the voltage E, and substantially exceeds the maximum inverse voltage which the diode 40′ can withstand. Moreover, the load resistor $R_1$ is much greater in value than that of the corresponding resistor R of FIG. 2. To prevent the inverse voltage $e_d$ across the diode 40 from rising above the maximum safe value, and to prevent the output voltage $e_o$ from falling below a predetermined value, the series combination of a clamping diode 50 and a control voltage or source $E_c$ are connected in parallel with the load resistor $R_1$. Diode 50 acts, in effect, as an "off" and "on" switch. Specifically, diode 50 is normally forwardly biased by the voltage or battery $E_c$; therefore, when the current $i_1$ through the diode 40′ has relatively small value (i.e. the diode is dark) diode 50 permits current to flow from battery $E_c$ through resistance $R_1$, diode 50 and back to battery $E_c$. Whenever the voltage $e_o$ tends to fall below the voltage $E_c$, this auxiliary current through diode 50 flows and the voltage $e_o$ is "clamped" so that it must always be at or above the value of the voltage $E_c$. The voltage $e_d$, which is the difference between the voltage $E_1$ and the output voltage $e_o$, can never exceed the value $E_1-E_c$. For example, if it is assumed that the maximum voltage which the diode 40′ can withstand is 50 volts, and that the battery voltage $E_1$ is selected to be 150 volts, then the auxiliary voltage will be made 100 volts in value.

If the photo diode 40′ receives no light, or relatively little light, the current through the diode 40′ is relatively small and this would ordinarily make the voltage drop $e_o$ across resistance $R_1$ small. However, under these conditions the clamping diode 50 is forwardly biased, so that the voltage $e_o$ is held at a minimum value equal to the voltage $E_c$. As the light incident on the photo diode 40′ is increased, and the current $i$ therethrough increases sufficiently to in itself produce a voltage drop across resistance $R_1$ which exceeds the voltage $E_c$, the clamping diode 50 becomes reversely biased and non-conductive. Thereafter, the potential of battery $E_c$ is effectively removed from the circuit, and the full potential of battery $E_1$ is applied across the voltage divider constituted by the diode 40′ and resistor $R_1$. The load line for the circuit thus breaks sharply and in the operating range has a reduced slope to provide a greater difference Δ in the critical zone of operation.

Figure 5A:
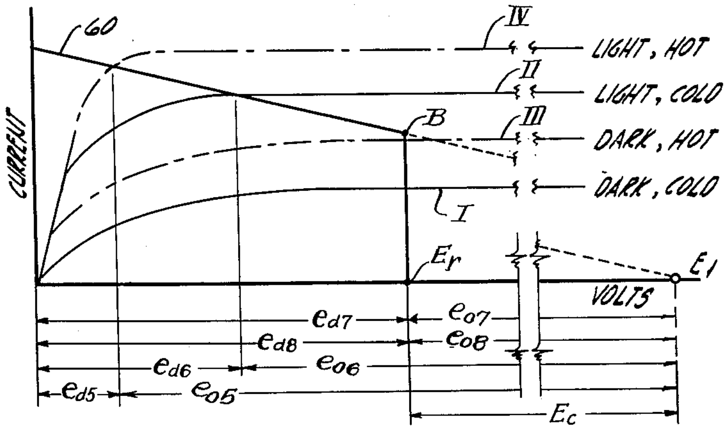

For a more complete understanding of the advantageous operation of the circuit shown in FIG. 4 and how clamping diode 50 controls the break in the load line, reference is made to FIG. 5*a* which includes the same exemplary family of curves I–IV that is shown in FIG. 3*a*, with light signal levels and ambient temperatures being indicated by the legends adjacent the ends of the various curves. Load line 60 indicates how the current flow through diode 40′ changes with the variations in light and temperature conditions when the specific load resistance $R_1$ is used. As previously noted, the value of load resistance $R_1$ (FIG. 4) is greater than the value of load resistance R (FIG. 2); therefore, the slope of load line 60 (FIG. 5*a*) is substantially less than the slope of load line 45 (FIG. 3*a*). Moreover, the potential of battery $E_1$ is substantially greater (two to three times greater) than the potential of battery E; therefore, the point $E_1$ at which load line 60 intersects the zero axis has been shifted to the right as shown in FIG. 5*a*. However, the full potential of battery $E_1$ is never applied across diode 40′ because clamping diode 50 begins to conduct at point "B" and voltage $e_d$ is thereafter limited to $E_1-E_c$, or the point "$E_r$" in FIG. 5*a*. Thus, the effective load line for the circuit of FIG. 4 is represented by the line 60 to the left of point B, and by the vertical line between points B and $E_r$. That portion of the load line to the right of point B is never operated upon, and has been shown in dashed lines merely to indicate its intersection with the horizontal axis at $E_1$.

Keeping the foregoing description of FIGS. 4 and 5*a* in mind, it is seen that the following considerations control the selection of the various points that are shown in the graph of FIG. 5*a*. The potential applied across diode 40′ must not exceed its rated limit; therefore, point "B" may not have a voltage which is in excess of voltage $E_r$. Having selected the value of voltage $E_1$, the maximum or rated diode voltage $E_r$ is subtracted from $E_1$ to determine the value of the control voltage $E_c$, i.e., $E_c=E_1-E_r$. Next, to assure a wide step or change in the output voltage $e_o$ in response to light and dark signals, the point B must be lower than the lowest "light" curve in the family of characteristics. The high value of the resistance $R_1$ is chosen to locate the point B. For example, if the diode current when the diode is at the "cold" temperature and "light" is 45 microamperes, as indicated by the curve II, the point B is located at a level which corresponds to a slightly smaller current, i.e., 40 microamperes. The resistor $R_1$ is then given a value which will make the diode 50 cease conducting when the current $i_1$ exceeds 40 microamperes, i.e., to make the voltage across the resistor $R_1$ equal the control voltage $E_c$ when the photodiode current $i_1$ is 40 microamperes. Thus, as an example, the value of $R_1$ is chosen such that $$R_1=\frac{E_c}{40\,\mu a.}=\frac{100\text{ volts}}{40\,\mu a.}=2.5\text{ megohms}$$

While the level of point B is always chosen to be at a current level less than that represented by the curve II for the light condition at the coldest expected temperature, it is preferably chosen to be at or just above the current represented by the curve III, i.e., the current which flows through the diode 40′ with a voltage $E_r$ applied thereto and with the diode "dark" and at the maximum expected "hot" temperature. This produces a maximum width for the difference Δ which will be discussed below in connection with FIG. 5*b*.

Beneath the horizontal zero axis of FIG. 5*a*, there is shown the manner in which the output signal $e_o$ and the voltage $e_d$ across the diode 40′ change with the varying light and temperature conditions. Since the voltage $E_r$ cannot exceed $E_1-E_c$, the minimum control potential $e_o$ cannot fall below the voltage value $E_c$; hence, the two "dark" output voltage values $e_{o7}$ and $e_{o8}$ for relatively "cold" and "hot" ambient temperatures are the same. Similarly the corresponding voltages $e_{g7}$ and $e_{d8}$ are the same in magnitude.

Figure 5B:
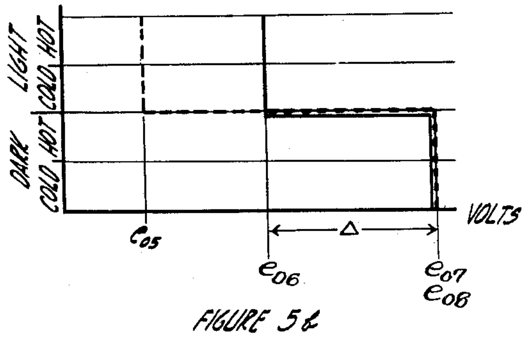

For a more graphic illustration of the manner in which the control potential $e_o$ changes with respect to the variable light and temperature conditions experienced by diode 40′, the values which are found from FIG. 5*a* have been plotted as a step curve in FIG. 5*b*. Specifically, when light strikes the diode 40′ and the latter is "cold," the $e_o$ signal changes from $e_{o7}$ to $e_{o6}$ as shown by the solid line curve in FIG. 5*b*. When light strikes the diode 40′ and the latter is "hot" or at the maximum expected temperature, the output signal $e_o$ changes from $e_{o8}$ to $e_{o5}$ as shown by the dot-dash line of FIG. 5*b*. Hence, the utlization device or trigger circuit 41 (FIG. 4) need only be sensitive enough to switch between "off" and "on" conditions in response to a relatively wide change of the output signal $e_o$ which is indicated in FIG. 5*b* by the Greek letter Δ. The important thing to note is that the critical voltage difference Δ has been greatly increased over the difference Δ in FIG. 3*b*, without increasing the maximum value of the voltage $e_d$ which may appear across diode 40′.

Figures 6, 7, 8, 9:
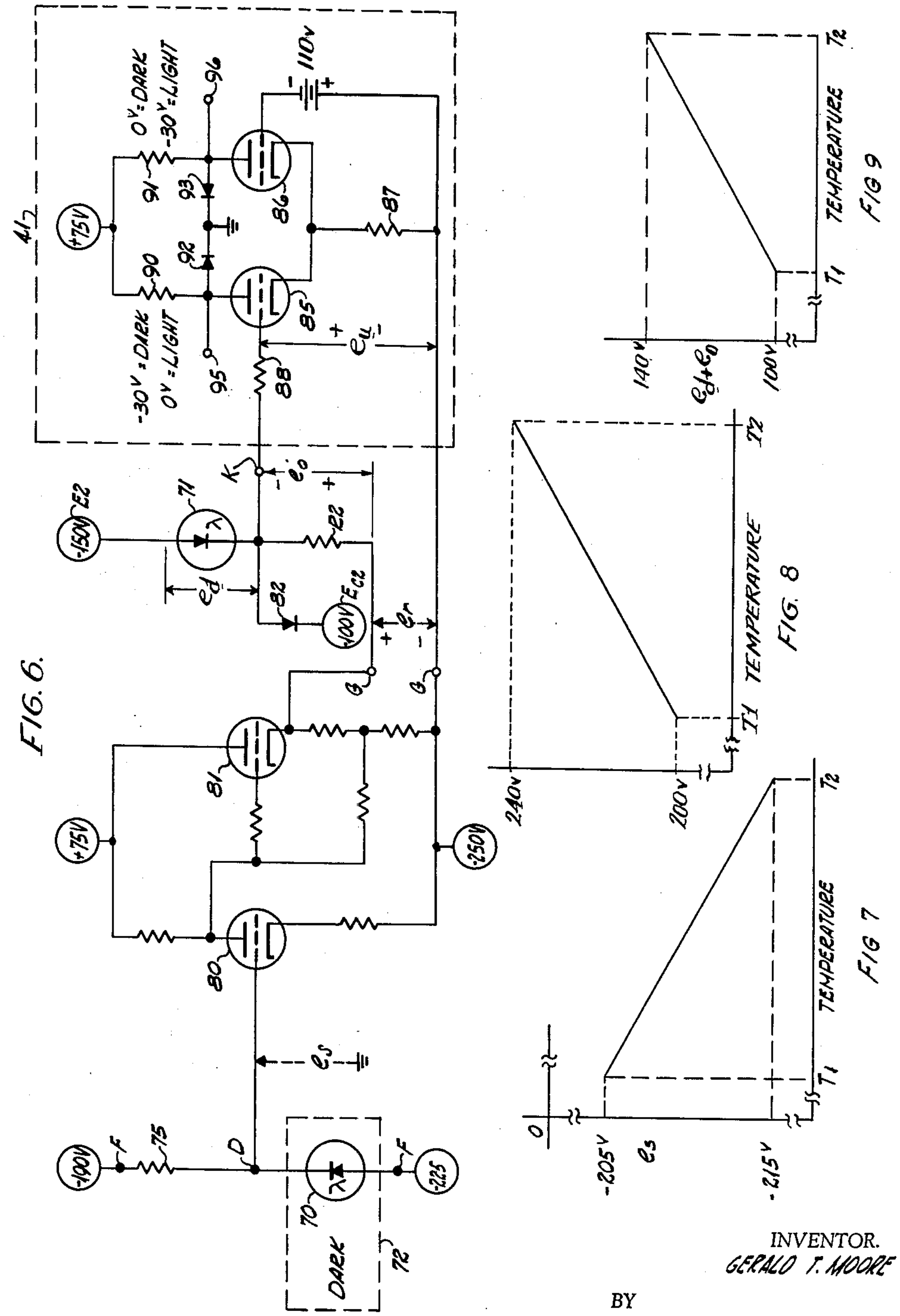
FIG. 6 is a circuit diagram showing a second embodiment of the invention including an auxiliary semiconductor device producing an automatically changing supply voltage to compensate for aging and other changes in characteristics of a principal semiconductor device.
FIGS. 7–10 are graphs which help explain the manner in which the load line of the circuit illustrated by FIG. 6 shifts with ambient temperature variations.

Referring next to FIG. 6 which illustrates another embodiment of the invention, a photosensitive diode 71 is there shown connected in a circuit similar to that of FIG. 4. According to another feature of the invention, a matched pair of semiconductor devices are connected to provide further self-compensating changes responsive to changes in the environmental or physical conditions experienced thereby. More particularly, the changing characteristics of the diode 71 are further compensated for by shifting the load line of the circuit automatically so that the output voltage provided thereby under a given condition of light excitation ("light" or "dark") remains at substantially the same value, even though the voltage-current characteristic of the diode 71 shifts upwardly or downwardly with age or changing environmental factors.

For this purpose, a reference or sensing diode 70 (FIG. 6) is employed, being of the same type as the diode 71 so that it will experience the same changes in characteristics as a result of aging, changing temperatures or other factors. Diodes 71 and 70 are mounted in the same apparatus, e.g., the same reading head, so that they will age in the same way and be subjected to the same temperatures or environmental changes. The diode 70, however, is permanently masked from light, for example, by being enclosed in a light-tight box 72.

More particularly, a control signal $e_s$, which varies with the reverse resistance of the diode 70, appears at midpoint D of a voltage divider connected between terminals F—F of an appropriate voltage source. If the characteristics of the diodes 71 and 70 drift for any reason, the back resistance of the diode 70 and the voltage $e_s$ correspondingly increase or decrease. The grid of an amplifier tube 80 is connected to point D, thereby causing an amplification of compensating signal $e_s$ by a gain factor which is selected to compensate for the drift of the diode 70 as it functions in the particular circuit that is shown in FIG. 6. The output of amplifier 80 is applied to drive a cathode follower 81 which is provided to match the impedance of amplifier 80 to the impedance of the light sensing circuit, i.e. the impedance appearing at points G—G. The compensating signal $e_s$ is, therefore, changed by amplification to become a reference potential $e_r$.

The light sensing circuit for the diode 71 in FIG. 6 is substantially the same as that described above in connection with FIG. 4, the various components being related as follows: Diode 71 is similar to diode 40′, clamping diode 82 is similar to diode 50, the battery $E_2$ is similar to battery $E_1$, the potential $E_{c2}$ is similar to potential $E_c$, and resistor $R_2$ is similar to resistor $R_1$. Hence, the output signal $e_o$ which occurs in the circuit of FIG. 6 is substantially the same as the output signal $e_o$ which occurs in FIG. 4 except that the circuit of FIG. 6 has been further stabilized by the introduction of the compensating changes of the voltage $e_r$ appearing between points G—G.

For a more complete understanding of how these compensating changes occur, reference is made to FIGS. 7–10 which illustrate the parameters of FIG. 6. For convenience of description, reference is made in FIGS. 7–10 only to ambient temperature changes; however, it should be understood that there may be changes in the characteristics of the diodes 71 and 70 caused by other factors such as aging of semiconductor materials, or spurious radiations from radioactive sources. As shown in FIG. 7, the signal $e_s$ changes from −205 volts to −215 volts as the temperature of diode 70 increases from temperature $T_1$ to temperature $T_2$, which represent a range of say 65° F. to 120° F. experienced by many types of electronic equipment. As shown in FIG. 8, the signal $e_s$ is amplified in tubes 80 and 81 to produce a reference voltage $e_r$ having corresponding changes of a different magnitude (e.g., 200 volts to 240 volts), such magnitude being selected to compensate for the spurious changes of conductivity of the diode 71. The supply voltage for the circuit of diode 71 in FIG. 6 (and which corresponds to the supply voltage $E_1$ of FIG. 4) is in effect provided by the source $E_2$ (which includes the −150 volt and −250 volt sources, as shown) in series with the reference voltage $e_r$. If the voltage $E_2$ at the upper terminal of diode 71 has a value of −150 volts referred to ground, and the lower terminal G is at −250 volts referred to ground, then the total supply voltage across the series-connected diode 71 and the load resistor $R_2$ may vary (as shown in FIG. 9) from 100 to 140 volts as the diodes 70 and 71 are subjected to different temperatures and the reference voltage $e_r$ changes between 200 and 240 volts.

Figure 10:
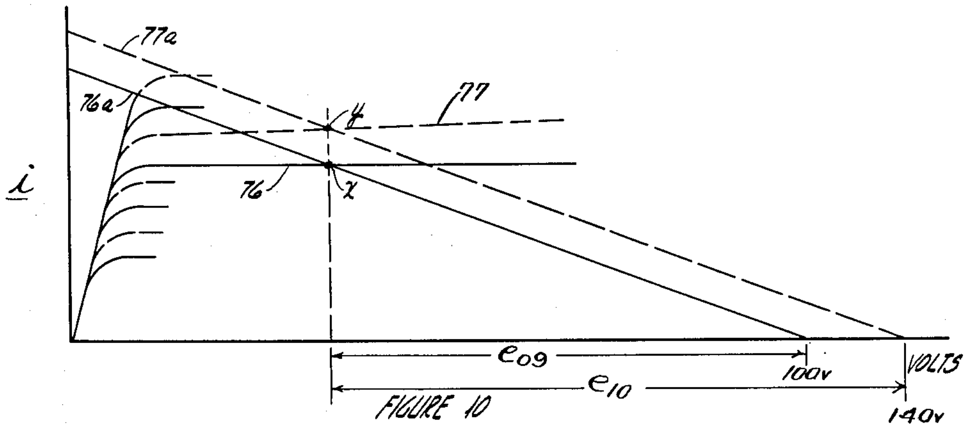

The effects produced by changing the supply voltage $E_2+e_r$, as illustrated in FIG. 9, are further illustrated by the graph of FIG. 10. More particularly, in FIG. 10 there are shown two sets of the same family of curves (only the cold, light curve 76 is shown in full) that is shown in FIGS. 3*a* and 5*a*. When the diode 71 is cold, the family of characteristic curves is typified by the solid line 76. As diode 71 is increased in temperature, the family of curves shifts upwardly, i.e., the curve 76 is raised to the level indicated by the dashed curve 77. Quite obviously, the curves which are not fully shown shift in a similar manner. When the diode 71 is cold and the compensating voltage $e_r$ is about 200 volts, the load line **76*a* is at a level which is determined by the 100 volts as the total supply voltage for the circuit of diode 71. This load line 76*a*** (FIG. 6) intersects the characteristic curve of FIG. 10 at point *x*. After the diode 71 is hot, the diode 70 will also be hot so that this voltage $e_r$ has a value of about 240 volts, and the load line shifts to the position **77*a* which corresponds to 140 volts as a supply voltage. This load line 77*a* intersects the curve 77** at point *y*. The important thing to note from FIG. 10 is that the load line is shifted vertically upward as temperature increases, or downward as temperature decreases, so that regardless of a shift in the diode characteristic curve from 76 to 77, or vice versa, the intersections *x* or *y* which determine the output voltage $e_o$ for the changing suppply voltage across the diode 71 and load resistor $R_2$ remain fixed in a horizontal direction. Thus, the output voltage changes from the value $e_{o9}$ to $e_{10}$ as shown in FIG. 10. However, the voltage $e_u$ supplied as the input to the utilization device or trigger circuit 41 is formed by the changeable reference voltage $e_r$ in series with the output voltage $e_o$, so that as the output voltage changes from $e_{o9}$ to $e_{10}$, the utilization voltage $e_u$ remains substantially constant. It will thus be seen that the compensating diode 70 of FIG. 6 causes the voltage $e_u$ supplied to the trigger circuit 40 to remain approximately the same, for a given light excitation, despite the drifting of the characteristic curve of the diode 71.

Returning to FIG. 6, trigger circuit 41, which is also shown in block form by FIGS. 2 and 4, includes two tubes 85 and 86 which are cross-coupled by a common cathode resistor 87. The input voltage $e_u$ is applied between the lower end of the cathode resistor 87 and the grid of tube 85, while the grid of tube 86 is held at a fixed potential relative to the lower end of the resistor 87 by a source here shown as a 110 volt battery. Load resistors 90 and 91 lead from the tube anodes to a positive voltage source, while clamping diodes 92 and 93 prevent the potential of either anode from becoming more positive than ground or zero volts in potential.

In operation, when diode 71 is dark, the voltage $e_o$ is relatively small and the input signal $e_u$ is relatively large, so that tube 85 conducts and draws substantial current through cathode resistance 87. The resulting voltage applied to the cathode of tube 86 is positive relative to its grid, and the tube is turned "off." Therefore, when diode 71 is dark, a relatively great negative potential (e.g. −30 volts) appears at anode terminal 95 and anode terminal 96 is at zero volts. When light strikes diode 71, the output voltage $e_o$ increases and the input voltage $e_u$ decreases, making the grid of the tube 85 more negative and driving that tube to cutoff. When current through cathode resistance 87 decreases, the control potential applied to the cathode of tube 86 becomes more negative relative to its grid, so that the tube is turned "on." Therefore, when light strikes diode 71, there is zero potential at anode terminal 95 and high negative potential (e.g., —30 volts) at anode terminal 96. These complementing responses at the output terminals 95 and 96 may, for example, serve as input signals for decoding apparatus.

Figure 11:
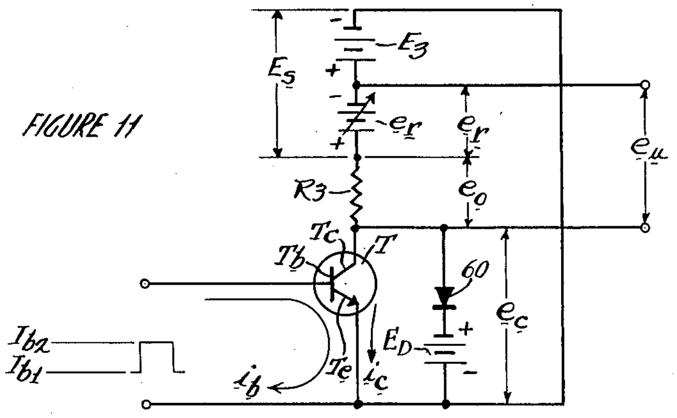
FIG. 11 is a circuit which illustrates how the invention may be applied to semiconductor devices other than photoelectric cells.

Referring now to FIG. 11, a circuit is there shown which embodies the features of the invention, previously described in connection with a semiconductor diode, to compensate for changes in the activity of a transistor, i.e., changes in the back resistance of its collector-base junction. The transistor T in FIG. 11 is of the NPN type, having a base $T_b$, an emitter $T_e$ and a collector $T_c$. The collector-base junction is reversely biased by a supply voltage here shown as a fixed voltage source or battery $E_3$ in series with a variable reference voltage $e_r$. The latter voltage is derived in a manner similar to that described in connection with FIG. 6, i.e., from a reference transistor (not shown) which is identical to the transistor T and subjected to the same environment. The reference voltage $e_r$ shown in FIG. 11 may be considered as varying between 0 volts and 30 volts as the transistor T is subjected to changing ambient conditions, e.g., is changed from a "cold" to a "hot" temperature. Assuming that the maximum rated reverse bias on the transistor junction is 25 volts, the battery voltage $E_3$ may be chosen to be several times greater, or about 100 volts. The total supply voltage $E_s$ (which is the sum of $E_3+e_r$) across the collector junction and series load resistor $R_3$ is thus 100 to 130 volts, depending on the temperature of the transistor.

As previously indicated in connection with the photo diode compensation circuits, the load resistor $R_3$ is made relatively large in value to produce an operating load line for the circuit which has a relatively small slope. In order to clamp the collector voltage $e_c$ so that it can never exceed the rated value (e.g., 25 volts) despite the high value of the supply voltage $E_S$, a clamping diode 60 in series with a clamping voltage source or battery $E_D$ is connected across the collector-emitter terminals of the transistor T. The battery $E_D$ is chosen to provide a voltage, e.g., 25 volts, equal to or less than the maximum rated collector voltage and is poled to make the diode 60 normally non-conductive. If, however, the collector voltage $e_c$ tends to exceed the voltage $E_D$ when relatively little collector current $i_c$ flows through the load resistor $R_3$, then the diode 60 becomes conductive, passes current through the load resistor $R_3$, and thus holds the output voltage $e_o$ at or above a minimum value which makes the collector voltage $e_c$ be no greater than the battery voltage $E_D$.

The input signal to the transistor T is base current $i_b$ which may be considered as having either of two values $i_{b1}$ or $i_{b2}$ corresponding to the "dark" or "light" conditions which formed an input signal to the photodiode described above. When the base current $i_b$ is relatively small or large, the back resistance of the transistor collector-base junction is made respectively high or low, thus causing a relatively small or large collector current $i_c$ to flow through the load resistor $R_3$ and the transistor T. The output voltage $e_o$ thus increases or decreases when the base current $i_b$ is increased or decreased.

Figure 12:
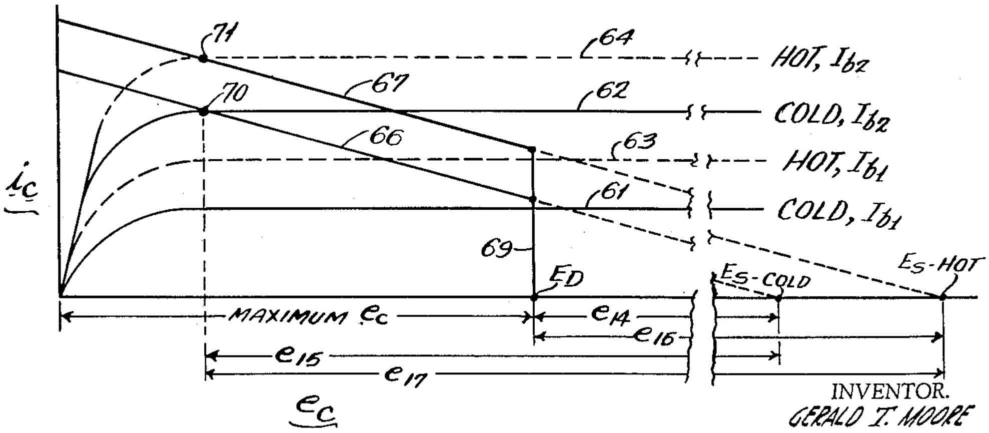
FIG. 12 is a graph which gives the response curves for the transistor of FIG. 11.

The manner in which spurious activity changes in the transistor are compensated for is best explained with reference to FIG. 12 which shows four curves 61–64 in the family of $i_c$ vs. $e_c$ characteristics of the transistor T. The curves 61 and 62 respectively represent the $i_c$ vs. $e_c$ relationships when the transistor T is, for example, "cold" but with the base current having respectively low and high values $i_{b1}$ and $i_{b2}$. The curves 63 and 64 shown in dashed lines illustrate the same relationships when the transistor T is at "hot" temperature. Load lines 66 and 67 illustrate the operating characteristics of the circuit in FIG. 11 when the transistor T is respectively "cold" or "hot." The shallow slope of these load lines is caused by the high value given to the load resistor R3, while their intersections with the horizontal axis and thus their vertical positions are determined by the value of the supply voltage $E_S$. The supply voltage $E_S$, in the example previously set forth, changes from 100 to 130 volts as the temperature of the transistor changes from "cold" to "hot" and the reference voltage $e_r$ changes from zero to 30 volts.

The vertical line 69 represents the farthest point to the right on the load lines 66, 67 at which the circuit of FIG. 11 may operate. That is, the maximum value which the collector voltage $e_c$ may have is the value of the voltage $E_D$, due to the clamping action of the diode 60.

With this understanding of FIG. 11, it will now be seen that when the transistor T is "cold," the output voltage $e_o$ will change from the value $e_{14}$ to the value $e_{15}$ as the base current $i_b$ changes from the low to the high values $i_{b1}$, $i_{b2}$. When the transistor T is "hot," the output voltage $e_o$ changes from the value $e_{16}$ to the value $e_{17}$ as the base current changes from $i_{b1}$ to $i_{b2}$. There is a wide difference between the voltages $e_{16}$ and $e_{15}$, so that a utilization device need not be critically sensitive to a given voltage level in order to respond to the output voltage $e_o$ as the activity of the transistor changes over a wide range.

More particularly, it should be noted that when the base current has a high value $i_{b2}$ and the temperature of the transistor T increases, the applicable one of the family of characteristic curves will rise from the position of the curve 62 to the curve 64. This, however, is accompanied by a rise in the load line from the position shown at 66 to that shown at 67. Therefore, the intersections at 70 and 71 in FIG. 11 show that the output voltage $e_o$ changes only slightly from $e_{15}$ to $e_{17}$, a magnitude equal to the change with temperature in the supply voltage $E_S$ and reference voltage $e_r$. But because, as shown in FIG. 11, the utilization voltage $e_u$ produced by the circuit is the algebraic sum of the voltages $e_o$ and $e_r$ which change in opposite senses with changes in temperature, the utilization voltage $e_u$ will remain substantially constant, for a given value of base current $i_b$, as the activity of the transistor, due to changes in temperature or other factors, changes over a wide range. It will be similarly apparent that with the transistor base current at the lower valve $i_{b1}$ (curves 61 and 62) the output voltages $e_o$ increases only from $e_{14}$ to $e_{16}$ as temperature is increased from a "cold" to a "hot" level. Thus, for constant base current $i_{b1}$, the utilization voltage $e_u$ does not change appreciably as the temperature or activity of the transistor T changes over a wide range.

I claim as my invention:

1. Electrical apparatus for compensating for drifting characteristics of a semiconductive junction photosensitive diode comprising a voltage divider connected across a source of potential, one arm of said voltage divider including said diode poled to oppose the flow of current and the other arm of said voltage divider including a load resistance, said source providing a voltage which is in excess of the maximum permissible reverse voltage for said diode, and means for limiting the upper level of the reverse potential applied from said source across said photocell when the latter is darkened and presents a high back resistance.

2. Electrical apparatus for compensating for drifting characteristics of a semiconductive photocell comprising a voltage divider connected across a source of potential, one arm of said voltage divider including said photocell and the other arm of said voltage divider including a load resistance, said potential source providing a voltage of a magnitude substantially in excess of the rated, safe voltage for said photocell, means for limiting the upper level of the potential applied from said source across said photocell to a value substantially less than the potential of said source, and means including a utilization device connected to a midpoint of said voltage divider for providing either of two output signals responsive to the application of light and dark signals to said photocell.

3. Electrical apparatus for compensating for drifting characteristics of a controlled semiconductive P-N junction device comprising a voltage divider connected across a source of potential, one arm of said voltage divider including said semiconductive device reversely poled relative to said source and the other arm of said voltage divider including a load resistance, said source providing a voltage which is in excess of the maximum rated inverse voltage of said device, and means for limiting the upper level of the reverse potential applied from said source across said semiconductive device to a value no greater than said maximum rated inverse voltage when such device is substantially cut off and presents a high back resistance.

4. Electrical apparatus for compensating for drifting characteristics of a semiconductor junction device comprising a voltage divider connected across a source of potential, said source of potential providing a voltage which is greater than the rated voltage of said semiconductor device, one arm of said voltage divider including said semiconductor device and the other arm of said voltage divider including a load resistance, means for limiting to a value no greater than said rated voltage the upper level of the potential applied from said source across said semiconductor device, and means including a utilization device connected to the midpoint of said voltage divider for providing either of two output signals responsive to the application of either of two input signals to said semiconductor device.

5. An electrical apparatus for compensating for drifting characteristics of semiconductive junction devices comprising means including a semiconductive junction device connected in series with a load device and coupled to be switched "off" and "on" responsive to the receipt of input signals of two different levels, means for applying a first reverse biasing potential across said semiconductive device when the latter is in an "off" condition and wherein said first potential remains substantially constant regardless of changes in the back resistance of such device due to activity changes therein caused by aging and changing ambient conditions, and means responsive to changes of current flow through said semiconductive device when switched "on" for applying a second reverse biasing potential across said semiconductive device, thereby causing a break in the load line of said semiconductive device.

6. An electrical apparatus for compensating for drifting characteristics of a semiconductor junction photodiode connected in series with a voltage source and a load device comprising means for switching said semiconductive device between "off" and "on" conditions responsive to the receipt of dark and light signals, means for deriving from said source and applying across said photodiode when said dark signal is applied thereto a first reverse bias potential which remains substantially constant despite changes in the activity of the photodiode, and means responsive to changes in current flow through said photodiode when a light signal is applied thereto for applying a second reverse biasing potential across said photodiode, said second potential being less than said first potential and being changeable with changes in the activity of said photodiode and the current which flows therethrough, thereby causing a break in the load line of said semiconductive device.

7. An apparatus for compensating for activity changes in controlled semiconductive junction devices comprising, a series circuit including a controlled semiconductive junction device, a load resistance, and a first source of potential connected to reversely bias said junction device; means including a clamping diode and a second source of potential connected in parallel with said load resistance for creating a first reverse biasing potential across said semiconductive device when the latter is turned off; the potential of said first source being greater than that of said second source and also greater than the rated inverse voltage for said junction device; and means responsive to a predetermined current flow through said series circuit for back biasing said clamping diode whereby said second potential is effectively removed and only said first potential is effective in said series circuit.

8. Electrical apparatus for compensating for activity changes in semiconductive material comprising a voltage divider having first semiconductor device in one arm thereof, said semiconductor device having predetermined characteristics, an amplifier connected to provide a changeable reference potential responsive to the changes in potential appearing at a midpoint of said voltage divider, a second semiconductor device also having said predetermined characteristics, a load device connected in series with said second semiconductor device, means utilizing said reference potential for applying a changeable operating potential across the series combination of said second semiconductor device and said load device, said changeable operating potential being in magnitude substantially greater than the rated voltage of said second semiconductor device, and means for limiting the upper level of the biasing potential across said second device thereby protecting said second semiconductive device against excessive voltage thereacross.

9. Electrical apparatus for compensating for activity changes in semiconductive photocells comprising a voltage divider having a first semiconductive photocell in one arm thereof and a resistance in the other arm thereof, means for maintaining constant the level of light incident on said first photocell, an amplifier connected to provide a reference potential responsive to potentials appearing at a midpoint of said voltage divider, a second semiconductive photocell having characteristics which are the same as the characteristics of said first photocell, a load resistance, a series circuit formed by said second photocell and said load resistance, means for applying an operating voltage across said series circuit, said operating voltage being substantially in excess of the rated, safe voltage of said second photocell, means responsive to said reference potential to vary said operating voltage in accordance with activity changes in said first photocell, and means for limiting the upper level of voltage applied across said second photocell thereby protecting said second photocell against damage by excessive biasing potential.

10. In a circuit having a controlled semiconductor junction device adapted to be turned "on" or "off" in response to two respective input signals supplied thereto, the combination comprising a first semiconductor junction device receiving at all times one of said signals, means for creating a compensating voltage which changes according to the conductivity of said first junction device and thus according to drifting or changing activity thereof, a second semiconductor junction device substantially identical to said first junction device, means for turning said second junction device "on" or "off," a load resistance, means for creating an operating potential which varies in accordance with changes in said compensating potential, said operating potential being at all times substantially in excess of the rated voltage of said second junction device, means connecting said second junction device and load resistance in series across said operating potential, and means for effectively increasing the value of said load resistance whenever the current through said second junction device drops below a predetermined value, thereby to prevent an excessive, destructive voltage bias across said second junction device.

11. In a circuit having a semiconductor junction photodiode adapted to receive "light" and "dark" signals, the combination comprising first and second substantially identical semiconductor photodiodes, means for maintaining said first photodiode in a "dark" condition and exposing it to the same ambient and aging conditions to which said second photodiode is subjected, circuit means associated with said first photodiode for creating a compensating voltage which varies substantially in proportion to changes in the activity thereof, means adapting said second photodiode to receive "light" or "dark" signals, a load resistance, means responsive to said compensating voltage to produce an operating voltage which increases and decreases according to increases and decreases in the activity of said first photodiode, said operating voltage being at all times greater than the rated, safe inverse voltage of said second photodiode, means connecting said load resistance and said second photodiode in series across said operating voltage with the latter poled to reversely bias the second photodiode, and means for increasing the slope of the load line produced by said load resistance whenever the inverse voltage across said second photodiode tends to become excessive.

12. In a circuit having a controlled semiconductor device with a reversely biased P-N junction and which is subject to drifting activity due to ambient temperature changes, aging, or the like, the combination comprising first and second substantially identical controlled semiconductor devices having P-N junctions, means for subjecting both of said semiconductor devices to the same ambient and aging conditions so that any changes in activity are substantially the same in both such devices, a source of operating voltage, which in magnitude exceels the rated, safe inverse voltage of said second semiconductor device, a load resistance, a series circuit comprising said load resistance and said second semiconductor device connected in series across said source with the latter poled to reversely bias such device, said source and load resistance normally providing an operating load line on the characteristic curves of said second semiconductor device which is of relatively slight slope, means associated with said series circuit and responsive to increases or decreases in the activity of said first semiconductor device for raising or lowering said load line without materially changing the slope thereof, and means associated with said series circuit for automatically increasing the slope of said operating load line as the current through said second semiconductor decreases below a predetermined value, so that the rated, safe inverse voltage across said second semiconductor device is not exceeded.

13. In a circuit having a P-N junction photodiode which is subject to drifts in activity due to aging, ambient temperature changes, and the like, the combination comprising first and second substantially identical P-N junction photodiodes, means for subjecting both of said photodiodes to substantially the same aging and ambient conditions, means for maintaining said first photodiode with a substantially constant level of incident light thereon, circuit means for reversely biasing said first photodiode and producing a compensating voltage which varies according to changes in the activity thereof, means adapting said second photodiode to receive "light" or "dark" levels of incident light thereon, a source of voltage which exceeds the safe, rated inverse voltage of said second photodiode, a load resistance, a series circuit comprising said load resistance, said second photodiode and said source with the latter poled to reversely bias said second photodiode, said series circuit normally providing an operating load line on the characteristic curves of said second photodiode which is of shallow slope and begins at a voltage in excess of the rated inverse voltage of said second photodiode, means coupled to said series circuit and responsive to changes in said compensating voltage for shifting said operating load line upwardly or downwardly in response respectively to increases or decreases in the activity of said first photodiode, and means associated with said series circuit for causing said load line to have an increased slope as the current flow through said second photodiode decreases below a predetermined value, thereby to prevent an excessive inverse bias across said second photodiode.

14. The combination comprising a controlled semiconductor device having a P-N junction, a load resistance, a source of voltage which exceeds the rated, safe inverse voltage of said semiconductor device, a series circuit comprising said load resistance and semiconductor device connected in series with said source and with the latter poled to reversely bias said P-N junction, said source and resistance normally establishing an operating load line on the characteristic curves of said semiconductor device which is of relatively slight slope and which terminates at a voltage in excess of the safe inverse voltage, and means associated with said series circuit for automatically causing said load line to have an increased slope in response to a decrease in the current flow through said semiconductor device, thereby to prevent excessive inverse voltages across the latter.

References Cited in the file of this patent

UNITED STATES PATENTS

| | | |
|---|---|---|
| 1,530,419 | Schmidt et al. | Mar. 17, 1925 |
| 2,751,549 | Chase | June 19, 1956 |